United States Patent [19]
Weber et al.

[11] Patent Number: 5,766,314
[45] Date of Patent: Jun. 16, 1998

[54] PROCESS AND DEVICE FOR TREATING WORKING ATMOSPHERE USING A CYCLONE EXCHANGER

[75] Inventors: Jean-Charles Weber, Dombasle sur Meurthe; Michel Parmentier, Vaudeville, both of France

[73] Assignee: France Grignotage, Dombasle, France

[21] Appl. No.: 601,703

[22] Filed: Feb. 15, 1996

Related U.S. Application Data

[63] Continuation-in-part of Ser. No. 150,834, Nov. 12, 1993, abandoned.

[30] Foreign Application Priority Data

Nov. 13, 1992 [FR] France ............................. 92 13819

[51] Int. Cl.$^6$ .......................... B01D 45/12; B01D 47/05
[52] U.S. Cl. ........................... 95/220; 55/222; 55/238; 55/257.4; 55/257.7; 55/269; 55/279; 55/460; 95/228
[58] Field of Search ................ 55/238, 220, 257.4, 55/228, 235, 237, 267, 257.7, 269, 279, 355, 432, 460, 222; 95/34, 220, 228, 271, 288

[56] References Cited

U.S. PATENT DOCUMENTS

| | | |
|---|---|---|
| 3,233,882 | 2/1966 | Calaceto ........................ 55/238 |
| 3,546,851 | 12/1970 | Hardison et al. ................ 55/238 |
| 3,574,562 | 4/1971 | Kawahata ...................... 55/279 |
| 3,582,051 | 6/1971 | Klein .......................... 55/279 |
| 3,853,505 | 12/1974 | Tretter, Jr. et al. ............. 55/238 |
| 3,922,151 | 11/1975 | Kiss et al. .................... 95/220 |
| 3,989,488 | 11/1976 | Wisting ........................ 55/238 |
| 3,990,870 | 11/1976 | Miczek ......................... 55/238 |
| 4,059,419 | 11/1977 | Ross ........................... 95/220 |
| 4,308,039 | 12/1981 | Djololian et al. ............... 55/238 |
| 4,308,040 | 12/1981 | Rafson et al. .................. 55/238 |
| 4,519,990 | 5/1985 | Bevilaqua et al. ............... 55/238 |
| 4,734,109 | 3/1988 | Cox ............................ 55/238 |
| 4,908,049 | 3/1990 | Yoshida et al. ................. 55/238 |
| 5,230,166 | 7/1993 | Deng ........................... 55/269 |

*Primary Examiner*—C. Scott Bushey
*Attorney, Agent, or Firm*—Weiser and Associates, P.C.

[57] ABSTRACT

A process for the pollution-cleaning treatment of air combines the actions of dehumidification, thermal control, washing of the gases, fixing of the particles, disinfection, spraying and vaporization. An apparatus is provided for implementing the process, and includes a cyclone exchanger or a pseudo-cyclone exchanger which includes a nozzle for injecting a fixing liquid into the inlet stream.

29 Claims, 3 Drawing Sheets

PROCESS AND DEVICE FOR TREATING WORKING ATMOSPHERE USING A CYCLONE EXCHANGER

This application is a continuation-in-part of application Ser. No. 08/150,834 filed Nov. 12, 1993 now abandoned.

BACKGROUND OF THE INVENTION

This invention relates to a process and an apparatus for controlling working and packaging atmospheres.

The control of working and packaging atmospheres has become a technical, economic and environmental requirement in numerous industries where the pollution load of dust, or inert or living particles, or even humidity alone, leads to strong deterioration in desired quality. This treatment is generally carried out using a complex system of filters combined with disinfectants, the maintenance of which is particularly demanding. In the absence of such maintenance, mostly based on exchanging clogged or infected filters, the system very rapidly becomes not only inefficient but also itself a source of pollution.

Such installations are not only costly as regards equipment, but also expensive in terms of operation. This is because, if a very strict management of exchanges is not adhered to, the systems rapidly become inefficient and even dangerous.

These operations are, however, increasingly required in industries as diverse as the food, pharmaceutical, electronics and coatings industries, and obviously hospital structures.

SUMMARY OF THE INVENTION

The primary object of the present invention is to simultaneously produce, in a single operation and in a single apparatus with a cyclone or a pseudo-cyclone geometry, the following functions:

condensation of vapours, in particular of water vapour (i.e. dehumidification), washing gases, i.e. pollution cleaning, fixing dust, reducing microbe populations, cooling or heating the air ejected, as desired, spraying and vaporization.

The invention is comprised of a combination of systems hinging around a cyclone exchanger, making it possible to take advantage of the special turbulence associated with this kind of exchanger for producing, concomitantly, washing of the gases and fixing of the dust and microbes by an expedient injection of iced water in the form of a controlled aerosol. This injection, carried out at a controlled rate into the inlet stream of air to be treated, uses an aqueous or non-aqueous liquid, depending on its specific requirements. Optionally added to the liquid is an appropriate disinfectant or surfactant, which completes the sanitation.

More particularly, the present invention relates to a process for a pollution-cleaning treatment of air which combines the actions of dehumidification, thermal control, washing of the gases, fixing of the particles, disinfection, spraying and vaporization. To this end, an aerosol is introduced at the nozzle of the cyclone exchanger which is kept as close as possible to the saturation point, without exceeding the saturation point for the inlet stream. Thus, unlike prior systems, which are characterized by water droplets introduced at the nozzle, the system of the present invention avoids such condensation, and the presence of droplets in the inlet stream.

The present invention also relates to a device for implementating the process including a cyclone or pseudo-cyclone exchanger especially adapted to fulfill the foregoing functions.

As part of this, liquid separated from the gas in the cyclone is discharged from the base of the tank by a solenoid valve triggered automatically as soon as the level exceeds a fixed limit. The exchanger constituting the body of the cylinder is designed so as to maintain in the system the conditions of sufficient cooling of the air to be treated, to produce the desired hygrometric equilibrium. The temperature of the water injected upstream of the inlet is also calculated to obtain this result.

The invention will be better understood with the aid of the description which follows, made with reference to the drawings.

DETAILED DESCRIPTION OF PREFERRED EMBODIMENTS

Figure 1:
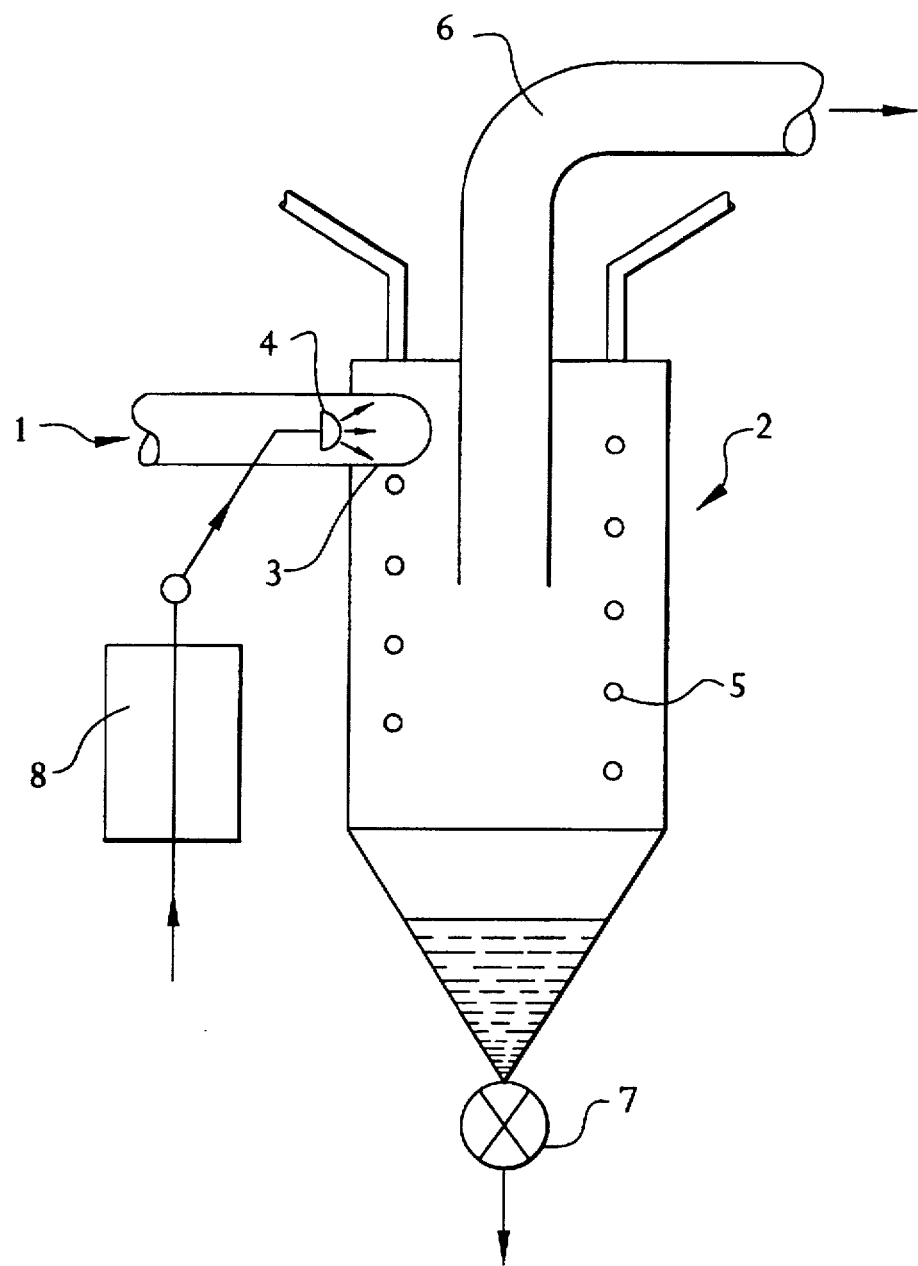
FIG. 1 is a schematic diagram of an apparatus for implementing the process of the present invention.

According to the present invention, and referring to FIG. 1 of the drawings, the flow of air (1) to be treated enters the cyclone exchanger (2) through the tangential inlet (3). Just before this inlet, there is an injection of iced liquid (aqueous or non-aqueous) in the form of an aerosol, through the nozzle (4) which is perfectly calibrated for its intended purpose and which intensifies the pollution cleaning. The injected liquid has previously been cooled in a water exchanger (8).

Such calibration is performed by controlling the vaporization conditions at the inlet (3) such that the air entering the cyclone exchanger (2) is kept as close as possible to the saturation point, without exceeding the saturation point. As a result of this, condensation is avoided, as is the presence of droplets at the inlet (3). Thus, the air entering the cyclone exchanger (2) constitutes a homogeneous phase, unlike the non-homogeneous phases of prior systems.

This result is achieved by saturating the air entering the cyclone exchanger (2) with water vapor so that a relative humidity is established which is close to 100%, but which does not exceed a value of 100%. Otherwise, the formation of water droplets would result. Cooling of the air entering the cyclone exchanger (2) is a result of this process, but is not particularly critical to achieving the desired result.

Inside the exchanger (2), the flow of air exchanges its heat with one or more coils (5), through which an appropriate coolant fluid passes, and then emerges through the axial outlet (6) to be ejected to the surroundings. At the base of the system, a solenoid valve (7), operating automatically on the basis of a level sensor, allows the retained polluted liquids to be discharged.

Figure 2:
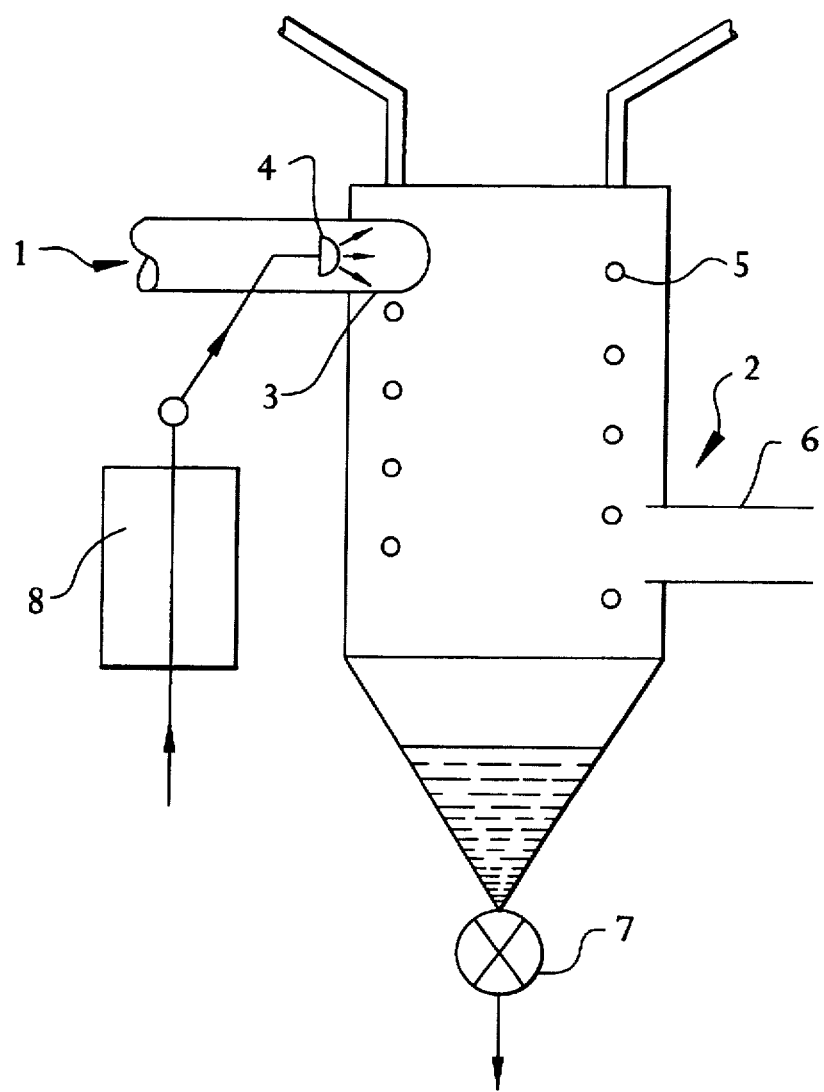
FIG. 2 is a schematic diagram of an alternative apparatus for implementing the process of the present invention.

In a variant of the invention, shown in FIG. 2 of the drawings, the cyclone device is advantageously replaced with a pseudo-cyclone exchanger with a tangential inlet and outlet, which device has the additional advantage of a smaller head loss.

It has been found that controlling the vaporization conditions at the inlet (3) of the cyclone exchanger (2) leads to significant improvement in the operations which follow, which are otherwise substantially conventional. Primarily, this arises from the role and the effect of injecting water at the inlet (3) and the impact of this on the washing of the gas which follows. The remainder of the operation (e.g., the centrifugal operation) has been found to have an "elimination" effect which is otherwise well known and conventional. However, those conditions established in accordance with the present invention (including controlling the injection of water) considerably modify the creation of the droplets which will subsequently be centrifuged.

It has been found that the particular effects of a conventional cyclone (or a pseudo-cyclone) involve the aggregation of the stream carrying the droplets (or other particles, etc.) into a spiral in the cyclone exchanger (2), which considerably limits the "effective section" of the resulting air stream for purposes of washing the gas. The resulting flow in the cyclone exchanger (2) is completely altered due to the homogeneous circulating phase which is established in accordance with the present invention.

In practice, it has been found that the gas washing which results is multiplied because such washing takes place along all portions of the cyclone exchanger (2) having cooling surfaces (i.e., the wall of the vessel and the coils). This is unlike prior systems where washing takes place only in the air stream, which occupies a relatively small fraction of the available space in the cyclone exchanger (2), or where washing is facilitated by a helicoidal structure in which the actual exchange takes place, which is accompanied by a considerable increase in loss of charge (leading to a drop in the trapping yield). The end result is a considerable increase in the washing yield of the present invention, because the system of the present invention employs the entirety of the space occupied by the exchange surfaces.

In accordance with the present invention, the elimination of particles carried by the air stream has been found to considerably improve the reducing power of the cyclone exchanger (2). The combination of the surfaces of the condensing coil (5) and the geometry of the cyclone exchanger (2) leads to continuous renewal of the surfaces of the cyclone exchanger (2), through its washing, in turn yielding an efficacy which is substantially constant over time.

This increase in washing efficacy has been demonstrated experimentally, for various ranges of particle size relative to the degree of saturation at the inlet (3). To this end, air was seeded with particles larger than 10 μm. This formed a spiral corresponding to a maximum concentration of particles, beginning at the entry to the vessel of the cyclone exchanger. It was found that the resulting spiral continued to the bottom of the vessel, where the removed particles are deposited. For finer particles (diameter smaller than 1 μm), a different distribution of the particles was found to be present in the flow. In the center of the flow, a disk-shaped region with few particles (which corresponds to the rising up of purified air) was found to be present. A "friction" zone was found to develop between the ascending flow and the descending air charged with the particles. At the exterior of the flow, the concentration of particles was found to be uniform and portions of the trajectories appeared to be generally circular (and thus, unfavorable to the trapping process). The presence of exchange surfaces (the coils (5), for example) can cut these circular trajectories and improve the trapping of submicron sized particles.

Figure 3:
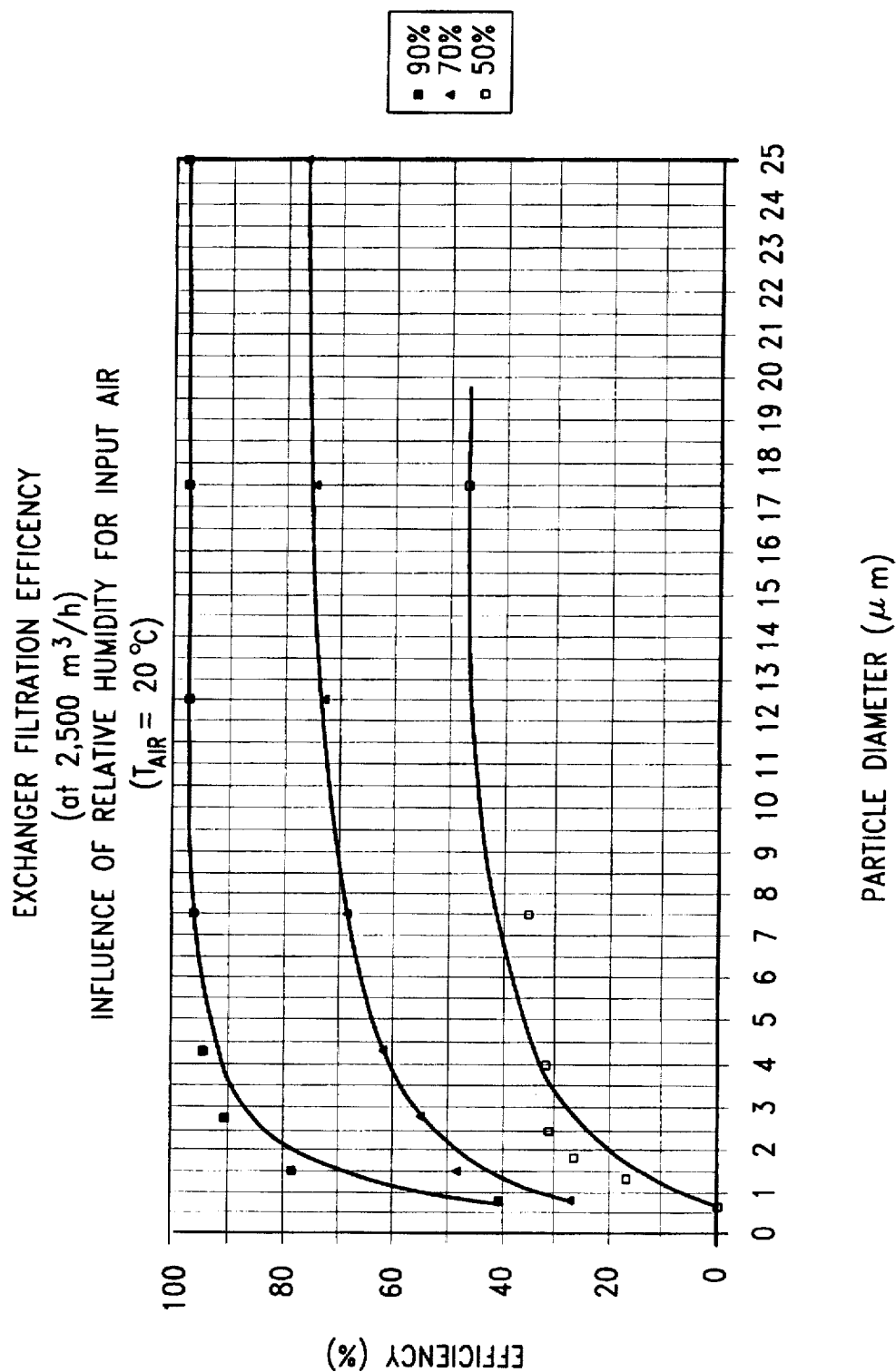
FIG. 3 is a graph illustrating the performance of the process of the present invention.

Referring now to FIG. 3, testing has shown that increasing the relative humidity of the air at the inlet (3) of the cyclone exchanger (2) enhances the trapping of particles (e.g., silica, atmospheric aerosol, etc.), even if the relative humidity (RH) remains below 100%. This effect is due solely to the condensation of water vapor contained in the air entering the cyclone exchanger (2).

These tests confirm that in an empty cyclone exchanger, particle distribution is dependent on particle granulometry. In testing performed relative to the trapping of gas pollutants and odors, primarily in the context of the deconheptaation of cooking effluents, it was further found that heavy aldehydes (e.g., heptanal, etc.) were present in the condensates. This, in turn, shows that the system of the present invention is capable of trapping the carbonyl compounds in the condensate, as well as the ketones. Again, this tends to confirm the positive influence of relative humidity and the neutral influence of temperature.

The main advantages of the invention will be summarized below.

The combination in such a system of dehumidification and the injection of a liquid allows both wasting of the gases and fixing of the solid pollutants (of the dust or microbe type). This makes it possible to concentrate in a single apparatus the advantages of systems which are complex, multiple, and difficult to maintain.

The system of the present invention is self-cleaning, for autonomous operation over long periods, on the sole condition that the liquid injected through the nozzle at the inlet remains in conformity as regards temperature, quantity and composition (surfactant, disinfectant, etc.).

The operation as a condenser inside the exchanger combined with the cyclone movement, causes the system to constantly be passed through by a highly turbulent flow of liquid droplets, from the top toward the bottom, where this liquid is continually removed. The system itself therefore accumulates no pollution, in contrast to filters.

The system ejects to the surroundings air a stream in which humidity, temperature, dust load and microbiological load are controlled.

It will be noted that the aerosol participates in the heat exchange with the coil or coils (cold or hot).

The exchanger (2) may include an additional hot coil. The exchanger then has an additional function of vaporizing, and operates as a drier.

We claim:

1. A process for pollution-cleaning treatment of air which combines dehumidification, thermal control, washing of the air, particle fixing, particle disinfection, spraying and vaporization, and which includes the steps of introducing untreated air into an inlet at the top of a single-vessel exchanger having a cyclone geometry, forming an inlet stream flowing in a cyclone fashion from top to bottom in the single-vessel exchanger, injecting a fixing liquid as an aerosol into the inlet stream at the top of the single-vessel exchanger, defining a saturation point for the aerosol in the air, and controlling vaporization conditions of the inlet stream so that the saturation point is not exceeded, for treating the untreated air.

2. The process of claim 1 which further includes the step of including a disinfectant in the injected fixing liquid.

3. The process of claim 1 which further includes the step of including a surfactant in the injected fixing liquid.

4. The process of claim 1 which further includes the step of cooling the fixing liquid prior to the injecting step.

5. The process of claim 1 which further includes the step of passing the air and the injected fixing liquid over coils associated with the single-vessel exchanger, for cooling the air and the injected fixing liquid to form a condensate.

6. The process of claim 5 which further includes the step of collecting the condensate in bottom portions of the single-vessel exchanger.

7. The process of claim 6 which further includes the step of automatically discharging collected condensate from the bottom portions of the single-vessel exchanger.

8. The process of claim 5 which further includes the step of venting air from the single-vessel exchanger, to exterior portions of the exchanger.

9. The process of claim 8 wherein the single-vessel exchanger is a cyclone exchanger, and wherein the treated air is axially vented from the exchanger.

10. The process of claim 8 wherein the single-vessel exchanger is a pseudo-cyclone exchanger, and wherein the treated air is tangentially vented from the exchanger.

11. The process of claim 8 wherein the inlet stream is tangentially introduced into the single-vessel exchanger.

12. The process of claim 1 wherein the vaporization conditions establish a relative humidity which does not exceed 100%.

13. The process of claim 1 wherein the vaporization conditions are selected to prevent a formation of droplets.

14. The process of claim 1 wherein the vaporization conditions are selected to produce a homogeneous stream.

15. An apparatus for pollution-cleaning treatment of air which combines dehumidification, thermal control, washing of the air, particle fixing, particle disinfection, spraying and vaporization, which comprises a single-vessel exchanger having a cyclone geometry, an inlet in communication with the top of the single-vessel exchanger, for receiving untreated air and for delivering the untreated air to the single-vessel exchanger as an inlet stream flowing in a cyclone fashion from top to bottom in the single-vessel exchanger, and means for injecting a fixing liquid as an aerosol into the inlet stream at the top of the single-vessel exchanger, thereby defining a saturation point for the aerosol in the air, wherein the injecting means is operative to control vaporization conditions of the inlet stream so that the saturation point is not exceeded.

16. The apparatus of claim 15 wherein the fixing liquid includes a disinfectant.

17. The apparatus of claim 15 wherein the fixing liquid includes a surfactant.

18. The apparatus of claim 15 which further includes means in communication with the injecting means, for cooling the fixing liquid.

19. The apparatus of claim 15 wherein the single-vessel exchanger further includes cooling coils for cooling the air received from the inlet, thereby forming a condensate.

20. The apparatus of claim 19 wherein the single-vessel exchanger further includes bottom portions for collecting the condensate.

21. The apparatus of claim 20 which further includes means for automatically discharging collected condensate from the bottom portions of the single-vessel exchanger.

22. The apparatus of claim 19 which further includes an outlet for venting treated air from the single-vessel exchanger.

23. The apparatus of claim 22 wherein the single-vessel exchanger is a cyclone exchanger, and wherein the outlet is axially associated with the exchanger.

24. The apparatus of claim 22 wherein the single-vessel exchanger is a pseudo-cyclone exchanger, and wherein the outlet is tangentially associated with the exchanger.

25. The apparatus of claim 22 wherein the inlet is tangentially associated with the single-vessel exchanger.

26. The apparatus of claim 15 wherein the single-vessel exchanger consists essentially of a single vessel body containing heat exchanging coils therein, an inlet and an outlet for the air, and bottom portions for collecting condensate, for automatic discharge from the exchanger.

27. The apparatus of claim 1 wherein the vaporization conditions establish a relative humidity which does not exceed 100%.

28. The apparatus of claim 15 wherein the vaporization conditions are selected to prevent a formation of droplets.

29. The apparatus of claim 15 wherein the vaporization conditions are selected to produce a homogeneous stream.

* * * * *